(12) United States Patent
Lee (10) Patent No.: US 11,509,184 B2
(45) Date of Patent: Nov. 22, 2022

(54) ELECTRIC MOTOR WITH HOUSING FIXED TO END FACE OF STATOR CORE

(71) Applicant: Fanuc Corporation, Yamanashi (JP)

(72) Inventor: SeungJun Lee, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 71 days.

(21) Appl. No.: 16/861,396

(22) Filed: Apr. 29, 2020

(65) Prior Publication Data
US 2020/0366152 A1 Nov. 19, 2020

(30) Foreign Application Priority Data

May 15, 2019 (JP) .............................. JP2019-092262

(51) Int. Cl.
| | | |
|---|---|---|
| *H02K 21/14* | (2006.01) | |
| *H02K 5/10* | (2006.01) | |
| *H02K 1/18* | (2006.01) | |
| *H02K 7/14* | (2006.01) | |
| *H02K 15/14* | (2006.01) | |
| *B23K 26/08* | (2014.01) | |
| *B23K 103/20* | (2006.01) | |

(52) U.S. Cl.
CPC ............... *H02K 5/10* (2013.01); *B23K 26/08* (2013.01); *H02K 1/185* (2013.01); *H02K 7/145* (2013.01); *H02K 15/14* (2013.01); *H02K 21/14* (2013.01); *B23K 2103/20* (2018.08)

(58) Field of Classification Search
CPC ........... H02K 5/10; H02K 1/18; H02K 15/14; H02K 21/14; H02K 7/14; H02K 5/06; B23K 26/08
See application file for complete search history.

(56) References Cited

U.S. PATENT DOCUMENTS

| | | | |
|---|---|---|---|
| 5,075,585 A | 12/1991 | Teruyama et al. | |
| 5,945,759 A | 8/1999 | Tanaka et al. | |
| 10,998,801 B2 * | 5/2021 | Hasegawa | ............. F04B 39/121 |
| 2009/0266640 A1 * | 10/2009 | Oshima | .................... B62D 5/04 |
| | | | 180/444 |
| 2017/0050668 A1 * | 2/2017 | Kikuchi | ................... H02K 3/28 |

FOREIGN PATENT DOCUMENTS

| | | | |
|---|---|---|---|
| JP | 59101292 A | 6/1984 | |
| JP | 62171436 A | 7/1987 | |
| JP | 63189685 A | 8/1988 | |

(Continued)

OTHER PUBLICATIONS

JP-07163083-A machine translation, Nov. 6, 2021.*

*Primary Examiner* — Leda T Pham
(74) *Attorney, Agent, or Firm* — RatnerPrestia (57) ABSTRACT

A feed axis motor includes a front-side housing fixed to an end face of a stator core. The stator core is formed of a material with iron as a main component. The front-side housing is formed of a material with aluminum as a main component. The stator core and the front-side housing are coupled with each other at a welding mark generated by laser welding. The welding mark extends in a circumferential direction so as to cover a line of contact between the stator core and the front-side housing. The welding mark seals the boundary portion between the stator core and the front-side housing.

4 Claims, 7 Drawing Sheets

(56) References Cited

FOREIGN PATENT DOCUMENTS

| | | | | |
|---|---|---|---|---|
| JP | 03112344 | A | | 5/1991 |
| JP | 07163083 | A | * | 6/1995 |
| JP | 07163083 | A | | 6/1995 |
| JP | 2000037068 | A | | 2/2000 |
| JP | 2000278892 | A | | 10/2000 |

* cited by examiner

PRIOR ART

ELECTRIC MOTOR WITH HOUSING FIXED TO END FACE OF STATOR CORE

CROSS-REFERENCE TO RELATED APPLICATIONS

This application is a new U.S. Patent Application that claims benefit of Japanese Patent Application No. 2019-092262, dated May 15, 2019, the disclosure of this application is being incorporated herein by reference in its entirety for all purposes.

BACKGROUND OF THE INVENTION

1. Field of the Invention

The present invention relates to an electric motor including a housing fixed to an end face of a stator core.

2. Description of the Related Art

In the related art, it is known that an electric motor is used in order to move and rotate an article. Devices that include the electric motor are used in a variety of environments. For example, the electric motor may be used in an environment in which a large amount of foreign material such as dust is present.

For example, it is known that the workpiece is machined by a machine tool for cutting and polishing a workpiece. Powder dust and cutting fluid mist generated when the workpiece is machined are present in a machining chamber of the machine tool. The electric motor may be disposed inside the machining chamber. A feed axis motor configured to move a spindle head or a member supporting the workpiece may also be disposed inside the machining chamber. Since the electric motor is used in an environment where a large amount of chips and cutting fluid mist is present, the foreign material is likely to enter into the electric motor.

When the foreign material enters into the electric motor, performance of the electric motor may decrease or the electric motor may fail. For this reason, the electric motor preferably has a structure in which the foreign matter does not enter into the electric motor.

In the related art, an electric motor in which a stator and a rotor are disposed inside a sealed container is known (e.g., Japanese Unexamined Patent Publication No. 59-101292 A and Japanese Unexamined Patent Publication No. 63-189685 A). There is also known an electric motor in which a housing is fixed to an end face of a stator core. In this electric motor, it is known that boundary portions between electromagnetic steel sheets configuring the stator core and a boundary portion between the stator core and the housing are covered with a resin sealing agent (e.g., Japanese Unexamined Patent Publication No. 7-163083 A).

In addition, in the related art, there is known an electric motor in which electromagnetic steel sheets of the stator core are joined by laser welding (e.g., Japanese Unexamined Patent Publication No. 2000-278892 A and Japanese Unexamined Patent Publication No. 62-171436 A).

SUMMARY OF THE INVENTION

In an electric motor in which the stator is disposed inside a sealed container, the container that surrounds the stator needs to be prepared. On the other hand, in an electric motor in which a casing is fixed to an end face of the stator, a sealed container that surrounds the stator is not required. In such an electric motor, the boundary portion between the stator core and the casing needs to be sealed so that foreign material does not enter from the boundary portion.

As the seal member, for example, a resin seal material that cures over time can be disposed between the stator core and the housing. After the seal material is applied to a contact surface of the housing, the housing and the stator core can be fixed with a fastening member. However, when a liquid seal material is disposed and the amount of seal material is large, the seal material may seep outward from between the stator core and the housing. Even if the outwardly seeping seal material is wiped off, components of the seal material may remain. In regions where components of the seal material remain, there is a problem in that paint may not be disposed as desired. On the other hand, when the amount of seal material is small, there is a problem in that the space between the stator core and the casing cannot be sufficiently sealed. Thus, there is a problem in that it is difficult to control the amount of seal material.

Alternatively, a liquid seal material is disposed along the shape of the end face of the casing. The region where the liquid seal material is disposed is an elongated region, and thus there is a problem in that it is difficult to dispose the seal material. For example, a specialized technique is required when a worker disposes the seal material. Alternatively, if the seal material is disposed using a robot device or the like, the robot needs to be controlled with high precision. Thus, there is a problem in that it is difficult to dispose the liquid seal material at a desired position.

Further, a liquid seal material requires management for storage. For example, it is necessary to manage the temperature or humidity when storing the seal material since the seal material cures over time. Alternatively, if a device that applies the seal material is temporarily stopped, the nozzle of the device that applies the seal material may become clogged. Thus, management for storing the seal material is required.

Alternatively, a flat seal sheet or an O-ring formed of rubber or the like can be disposed as a seal member between the stator core and the housing. When such a seal member is used, a recess or the like for disposing the seal member in the housing needs to be formed. In addition, O-rings and seal sheets degrade over time and lose elasticity. When the stator core and the casing are fixed by bolts, the tightening strength of the bolts may decrease. In this case, the sealing performance of the seal member may be adversely affected.

Furthermore, the seal member disposed at the boundary portion between the stator core and the casing is formed of a resin, a rubber, or the like. Thus, heat transfer performance from the stator to the housing decreases. The electric motor mainly generates heat at the stator. Heat generated at the stator is released from the stator into the atmosphere or is cooled by air passing through a cooling path formed in the stator. Further, a part of the heat generated at the stator is transferred to the housing and then dissipated from the housing into the atmosphere. However, since the seal member is formed of a resin or a rubber, there is a problem in that heat transfer is not sufficiently performed. Thus, the temperature of the electric motor is likely to increase and the performance of the electric motor may need to be set low. In order to suppress an increase in the temperature of the electric motor, for example, the upper limit of the current supplied to the electric motor may be set low.

As described above, disposing the seal member between the stator core and the casing has resulted in various problems.

An electric motor according to an aspect of the present disclosure includes a rotor including a shaft and a stator including a stator core and a coil wound around the stator core. The electric motor includes a housing fixed to an end face of the stator core. The stator core is formed of a material with iron as a main component. The housing is formed of a material with aluminum as a main component. The stator core and the housing are coupled with each other by a welding mark generated by laser welding. The welding mark is formed at a boundary portion at which the stator core and the housing are contacting. The welding mark extends in a circumferential direction so as to cover a line of contact between the stator core and the housing. The welding mark seals the boundary portion between the stator core and the housing.

DETAILED DESCRIPTION

An electric motor according to embodiments will be described with reference to FIG. 1 to FIG. 10. The electric motor according to the present embodiment has a structure that suppresses foreign material from entering between a stator core and a housing.

Figure 1:
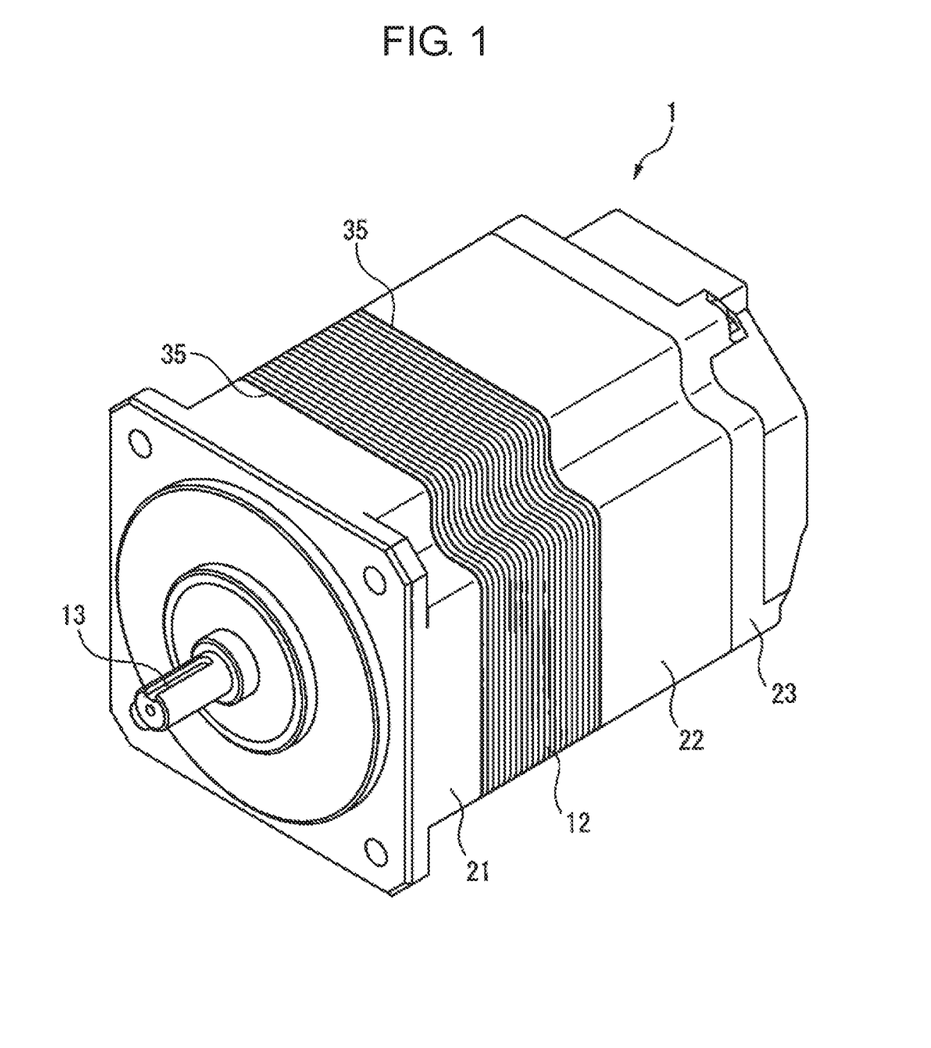
FIG. 1 is a perspective view of a first electric motor according to an embodiment.
Figure 2:
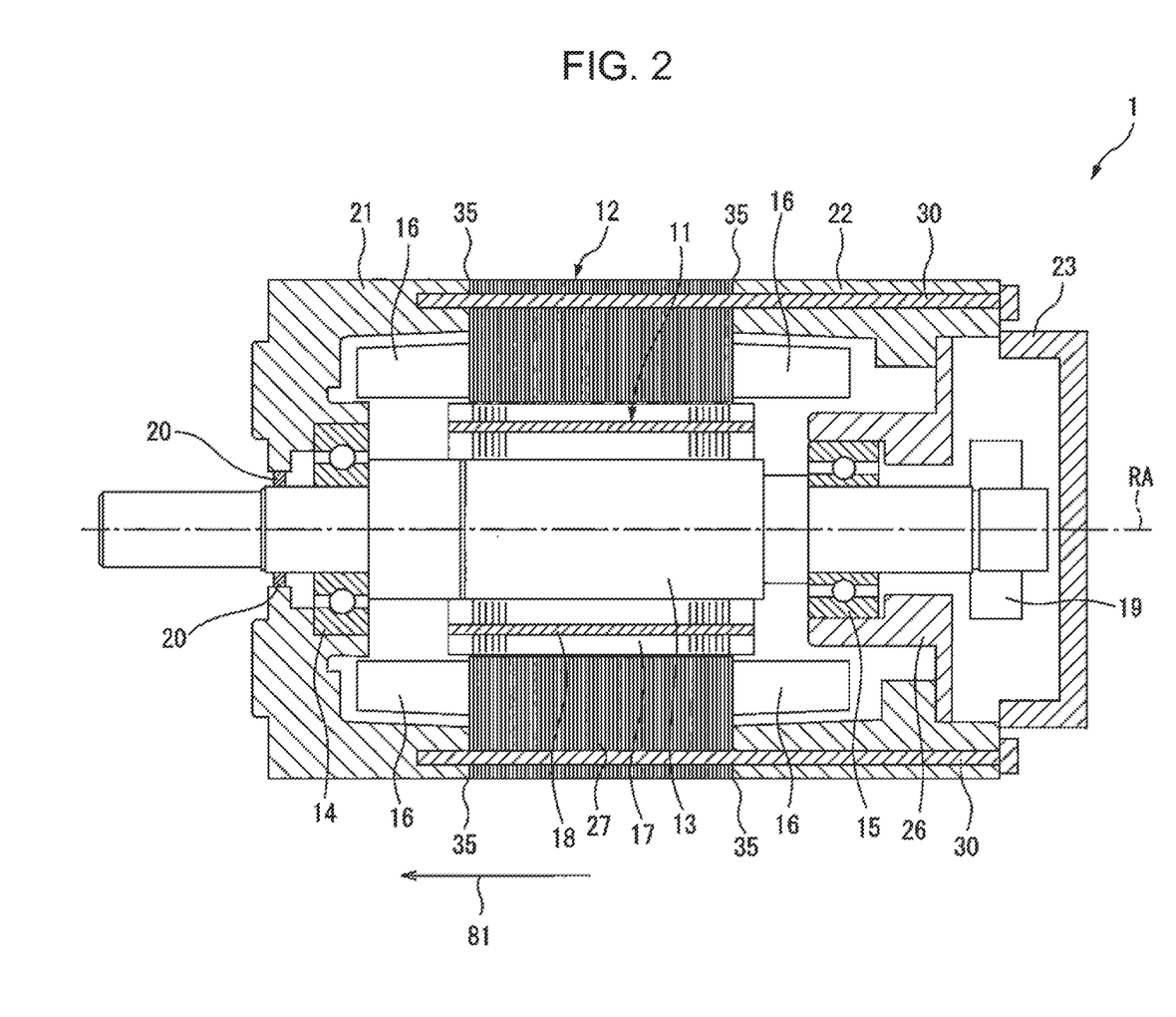
FIG. 2 is a schematic cross-sectional view of the first electric motor.

FIG. 1 is a perspective view of a first electric motor according to the present embodiment. FIG. 2 is a schematic cross-sectional view of the first electric motor according to the present embodiment. In FIG. 1 and FIG. 2, the electric motor is illustrated before the surface is painted in order to facilitate description. In the present embodiment, an electric motor disposed on a machine tool is described as an example.

With reference to FIG. 1 and FIG. 2, the electric motor according to the present embodiment is a feed axis motor 1 for moving a table or the like of a machine tool. The feed axis motor 1 is disposed inside a machining chamber of the machine tool. Foreign material such as powder dust or cutting fluid mist generated when a workpiece is machined is present in the machining chamber. The feed axis motor 1 has a structure that suppresses entry of foreign material.

The feed axis motor 1 includes a rotor 11 and a stator 12. The stator 12 includes a stator core 27 having a structure in which a plurality of magnetic steel sheets are stacked in the direction of a rotation axis RA. A coil 16 is wound around the stator core 27. The rotor 11 includes a shaft 13 formed into a rod shape, and a rotor core 17 fixed to an outer circumferential surface of the shaft 13. A magnet 18 is disposed inside the rotor core 17. The magnet 18 according to the present embodiment is a permanent magnet.

The shaft 13 is coupled with other member for transferring a rotational force. The shaft 13 rotates about the rotation axis RA. In the present embodiment, a side on which the shaft 13 protrudes so as to be coupled with the other member in the direction in which the rotation axis RA extends is referred to as a front side. Also, a side opposite to the front side is referred to as a rear side. In the example illustrated in FIG. 2, an arrow 81 indicates the front side of the feed axis motor 1.

The feed axis motor 1 includes a housing as a covering member fixed to the stator core 27. In the present embodiment, a plurality of housings are arranged. The feed axis motor 1 includes a front-side housing 21 disposed in a direction in which the shaft 13 of the rotor 11 protrudes, and a rear-side housing 22 disposed on a side opposite to the direction in which the shaft 13 protrudes.

The front-side housing 21 and the rear-side housing 22 are formed into a tubular shape. The front-side housing 21 and the rear-side housing 22 rotatably support the rotor 11 by intermediating bearings 14 and 15. The front-side housing 21 supports the bearing 14. The rear-side housing 22 supports the bearing 15 by intermediating a bearing support member 26 that supports the bearing 15. An oil seal 20 for suppressing entry of foreign material is disposed between an end of the front-side housing 21 and the shaft 13.

The front-side housing 21 and the rear-side housing 22 are fixed to axial end faces of the stator core 27. An end face of the front-side housing 21 and an end face of the stator core 27 are in contact. Additionally, an end face of the rear-side housing 22 and an end face of the stator core 27 are in contact. The front-side housing 21 and the rear-side housing 22 are fixed to the stator 12 by a fastening member. In the present embodiment, the front-side housing 21 includes a hole formed with an internal thread. Holes through which bolts 30 pass are formed in the stator core 27 and the rear-side housing 22. The front-side housing 21 and the rear-side housing 22 are fixed to the stator core 27 by the bolts 30 as fastening members.

In the feed axis motor 1 of the present embodiment, at the boundary portion between the front-side housing 21 and the stator core 27, the diameter of the front-side housing 21 is the same as the diameter of the stator core 27. The surface of the front-side housing 21 is formed so as to be continuous with the surface of the stator core 27. Further, at the boundary portion between the rear-side housing 22 and the stator core 27, the diameter of the rear-side housing 22 is the same as the diameter of the stator core 27. The surface of the rear-side housing 22 is formed so as to be continuous with the surface of the stator core 27. The feed axis motor 1 according to the present embodiment has a structure in which a container surrounding the outer circumferential surface of the stator core 27 is not disposed.

An encoder 19 for detecting a rotational position or a rotational speed of the shaft 13 is disposed at an end of the shaft 13 on the rear side. A rear cover 23 that closes the space inside the rear-side housing 22 is fixed to a rear end of the rear-side housing 22.

Figure 3:
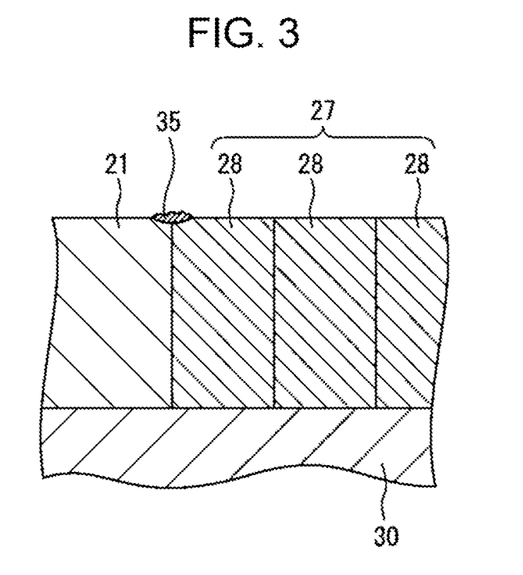
FIG. 3 is an enlarged cross-sectional view of a boundary portion between a front-side housing and a stator core according to an embodiment.

FIG. 3 is an enlarged cross-sectional view of the boundary portion between the front-side housing and the stator core in the first electric motor. Referring to FIG. 1 to FIG. 3, the stator core 27 according to the present embodiment has a structure in which a plurality of electromagnetic steel sheets 28 are stacked. The plurality of electromagnetic steel sheets 28 are fixed to each other. In the present embodiment, a plurality of blocks in which the electromagnetic steel sheets 28 are stacked is formed in advance. The stator core 27 is formed by overlaying the plurality of blocks.

Each of the electromagnetic steel sheets 28 is formed of a material with iron as a main component. That is, the stator core 27 is formed of a material with iron as a main component. On the other hand, the front-side housing 21 and the rear-side housing 22 are formed of a material with aluminum as a main component.

In the following description, the boundary portion between the front-side housing 21 and the stator core 27 will be described. In particular, a welding mark that couples the front-side housing 21 and the stator core 27 will be described. A welding mark formed at the boundary portion between the rear-side housing 22 and the stator core 27 has the same configuration, action, and effect.

The front-side housing 21 and the stator core 27 are coupled with each other by a welding mark 35. The welding mark 35 is a portion that cured after being melted by heat when performing welding. The welding mark 35 is formed at the boundary portion between the front-side housing 21 and the stator core 27. The welding mark 35 couples the outer periphery part of the end face of the front-side housing 21 and the outer periphery part of the end face of the stator core 27. A weld line that extend linearly is formed by the welding mark 35. The welding mark 35 extends in a circumferential direction so as to cover a line of contact between the front-side housing 21 and the stator core 27. In other words, the welding mark 35 is formed into an annular shape so as to surround the front-side housing 21 and the stator core 27. The welding mark 35 is formed across the entire boundary portion in the circumferential direction of the stator core 27 and the front-side housing 21.

In the feed axis motor 1 according to the present embodiment, the boundary portion between the stator core 27 and the front-side housing 21 is sealed by the welding mark 35. Thus, foreign material can be prevented from entering the feed axis motor 1 from between the stator core 27 and the front-side housing 21.

The welding mark 35 according to the present embodiment is formed by laser welding. In the present embodiment, different material welding is performed in which materials that differ from each other are welded. A fiber laser is used as an oscillation source for laser light. Since a small range can be coupled using laser welding, the range in which the electromagnetic steel sheets 28 and the front-side housing 21 are welded can be reduced.

In the present embodiment, the welding marks 35 are formed at both the boundary portion between the front-side housing 21 and the stator core 27 and at the boundary portion between the rear-side housing 22 and the stator core 27. The welding mark 35 is not limited to this configuration, and may be formed at any one boundary portion.

Figure 4:
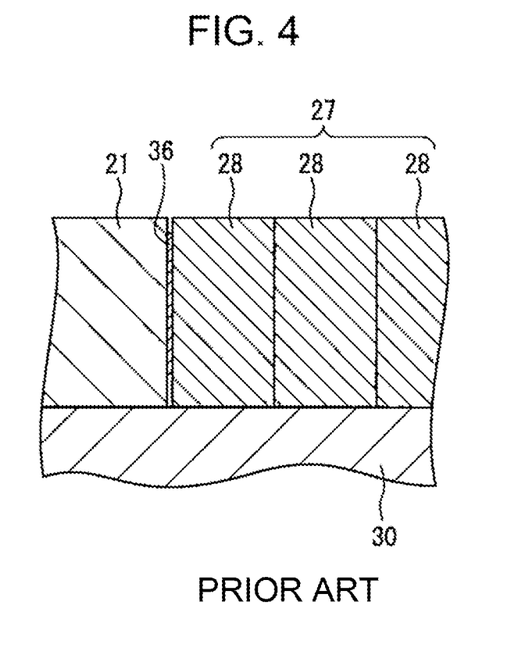
FIG. 4 is an enlarged cross-sectional view of a boundary portion between a front-side housing and a stator core in a comparative example.

FIG. 4 is an enlarged schematic cross-sectional view of a boundary portion between a front-side housing and a stator core in an electric motor according to a comparative example. In the electric motor of the comparative example, a seal material 36 formed of a resin is disposed between the front-side housing 21 and the stator core 27 as a seal member. The seal material 36 is formed by curing a liquid seal material. When disposing a liquid seal material on the end face of the front-side housing 21, there is a problem in that it is difficult to dispose the seal material at the correct position and in the correct amount. Liquid seal materials also require management for storage.

Further, a flat plate-like seal sheet formed of a rubber can be disposed in place of the seal material 36 as the seal member. Alternatively, a recess can be formed in the front-side housing and an O-ring formed of rubber can be placed in the recess. In such a case, the sealing function decreases since the elasticity of the seal sheet or the O-ring decreases due to aging.

Further, when a seal member formed of a resin, a rubber, or the like is disposed between the front-side housing and the stator core, there is a problem in that heat transfer performance from the stator core to the front-side housing decreases.

With reference to FIG. 3, in the electric motor according to the present embodiment, a seal member such as a seal material, an O-ring, or a seal sheet is not disposed between the front-side housing 21 and the stator core 27. In particular, no seal member formed of a rubber, a resin, or the like is disposed. The end face of the front-side housing 21 and the end face of the stator core 27 are in contact with each other.

In the feed axis motor 1 according to the present embodiment, control for disposing the liquid seal material and management of the liquid seal material are not necessary. Further, it is not necessary to form a recess or the like for disposing the seal sheet or O-ring, and a simpler structure can be achieved. Furthermore, since no seal member formed of a resin, a rubber, or the like is interposed, a high sealing function can be maintained even after a long amount of time has passed.

Further, since the stator core 27 is in contact with the front-side housing 21, heat generated at the stator 12 can be efficiently transferred from the stator core 27 to the front-side housing 21. The heat dissipation of the stator 12 is improved and an increase in temperature of the electric motor can be suppressed. As a result, the performance of the electric motor can be maintained at a high level without sacrificing performance of the electric motor. For example, when setting the upper limit value of current based on the increase in temperature of the electric motor, the rated current value may be set to a large value.

Further, the rigidity of the feed axis motor 1 can be increased since the stator core 27 and the front-side housing 21 are welded together across the entire boundary portion, which extends in the circumferential direction, between the stator core 27 and the front-side housing 21. In particular, in the present embodiment, the rigidity of the feed axis motor 1 can be increased since the front-side housing 21 and the rear-side housing 22 are fixed to the stator core 27 across the entire boundary portions in the circumferential direction.

Figure 5:
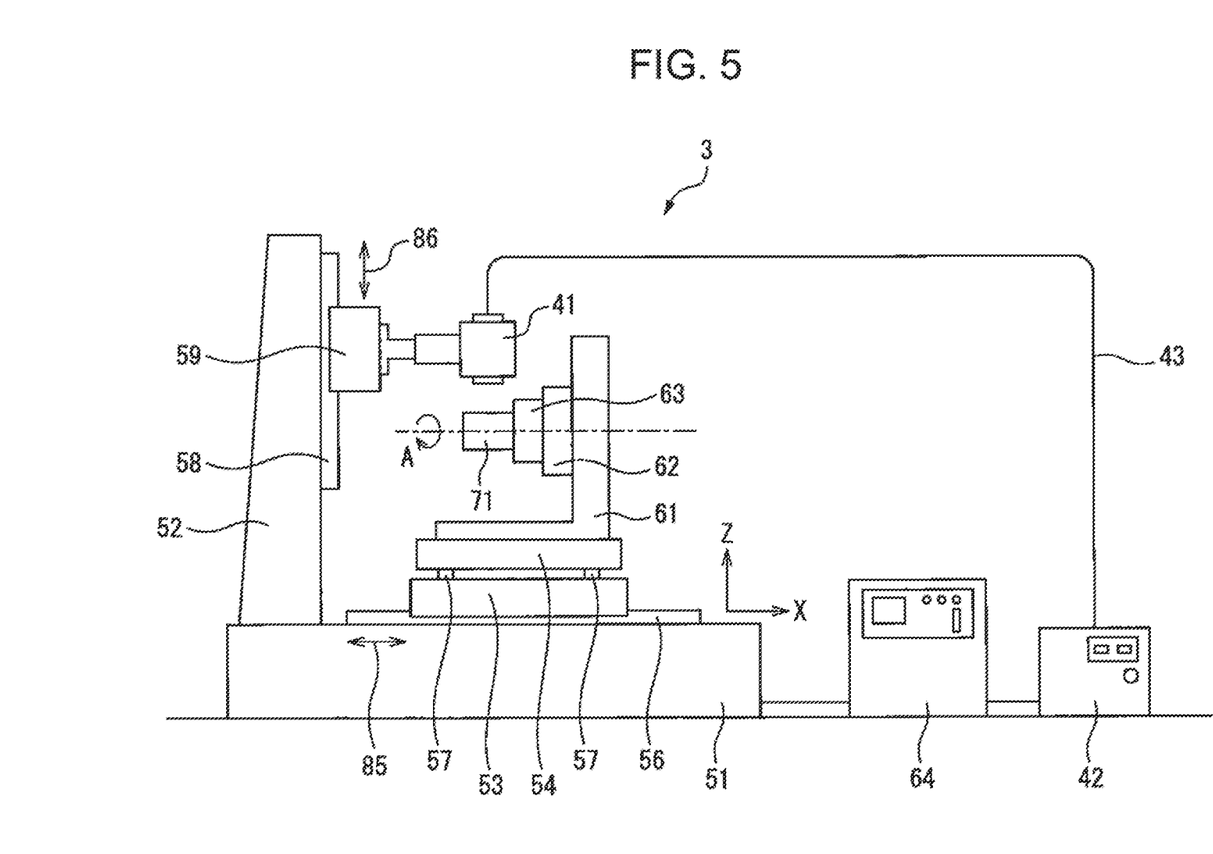
FIG. 5 is a schematic diagram of a welding device according to an embodiment.

Next, a welding device and a method of welding for forming the welding mark according to the present embodiment will be described. FIG. 5 is a schematic diagram of a welding device according to the present embodiment. A welding device 3 according to the present embodiment is a laser welding device configured to melt and bond a part of a workpiece using laser light. The welding device 3 includes a bed 51 as a base and a column 52 vertically provided from the bed 51. An X-axis guide rail 56 extending in the X-axis direction is disposed on a top face of the bed 51. A saddle 53 is disposed on the X-axis guide rail 56. The saddle 53 is formed so as to move along the X-axis guide rail 56 as indicated by the arrow 85. A Y-axis guide rail 57 extending in the Y-axis direction is disposed on a top face of the saddle 53. A table 54 is disposed on the Y-axis guide rail 57. The table 54 is formed so as to move along the Y-axis guide rail 57.

A support member 61 for supporting a rotation mechanism 62 is fixed to the table 54. The support member 61 has a cross-sectional shape formed into an L-shape. The rotation mechanism 62 is fixed to the support member 61. The rotation mechanism 62 includes a workpiece fixing portion 63 to which a workpiece 71 is fixed. The rotation mechanism 62 includes a motor for rotating the workpiece fixing portion 63. Through driving a motor, the workpiece fixing portion 63 rotates in an A-axis direction. In the present embodiment, the axis line of the A-axis extends in the horizontal direction.

A Z-axis guide rail 58 extending in the Z-axis direction is disposed on the column 52. A movement member 59 is engaged with the Z-axis guide rail 58. A laser welding head 41 that emits laser light is fixed to the movement member 59. The movement member 59 is formed so as to move along the Z-axis guide rail 58, as indicated by the arrow 86.

The welding device 3 according to the present embodiment is numerically controlled. The welding device 3 includes a movement device that moves at least one of the laser welding head 41 and the workpiece 71 along feed axes. The welding device 3 includes a controller 64 that controls the movement device. The controller 64 is configured by an arithmetic processing device (computer) including a central processing unit (CPU) as a processor. The movement device includes a motor disposed corresponding to each of the feed axes. In the welding device 3 according to the present embodiment, the movement member 59, the saddle 53 and the table 54 are moved by motors. The controller 64 drives a motor corresponding to the feed axis based on an operation program. Further, the controller 64 drives a motor arranged in the rotation mechanism 62 based on an operation program.

In the welding device 3 according to the present embodiment, the relative position of the laser welding head 41 with respect to the workpiece 71 can be changed while irradiating the workpiece 71 with laser light. In this way, the laser welding head 41 can be moved relative to the workpiece 71 to thereby perform welding in a variety of shapes. The workpiece 71 according to the present embodiment is an assembly in which the front-side housing 21 and the rear-side housing 22 are fixed to the stator core 27 by the bolts 30.

The welding device 3 includes a laser oscillator 42 that oscillates a laser beam. Laser light oscillated by the laser oscillator 42 is supplied to the laser welding head 41 through an optical fiber 43. The laser oscillator 42 includes a light source that oscillates a laser beam. The light source according to the present embodiment is a fiber laser. The laser oscillator can include any light source capable of welding a workpiece. For example, the laser oscillator can include any type of light source capable of performing laser welding, such as a carbon dioxide laser. The controller 64 controls the laser oscillator 42 and the laser welding head 41 based on operation programs.

Figure 6:
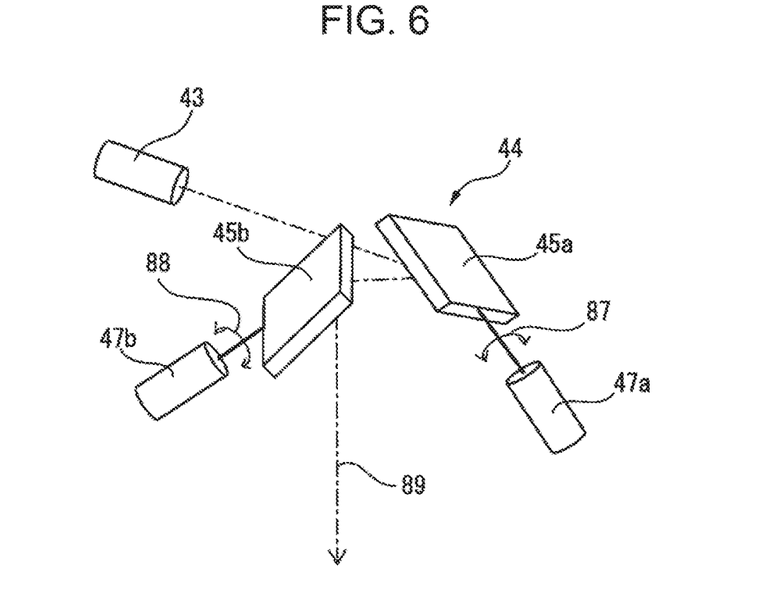
FIG. 6 is a perspective view explaining a galvano mechanism.

FIG. 6 is a schematic view of a mechanism inside the laser welding head according to the present embodiment. The laser welding head 41 emits laser light from an exit port. The laser welding head 41 according to the present embodiment has a drive mechanism that drives a lens for adjusting focal distance. The laser welding head 41 also includes an emission direction adjustment mechanism 44 that adjusts the direction of the laser beam emitted from the laser welding head 41. The emission direction adjustment mechanism 44 according to the present embodiment is a galvano mechanism.

The emission direction adjustment mechanism 44 includes a plurality of reflective plates and a mirror-driving motor. In the example illustrated in FIG. 6, the reflective plates include an X-axis mirror 45a that adjusts the direction of emission in the X-axis direction, and a Y-axis mirror 45b that adjusts the direction of emission in the Y-axis direction. The laser light emitted from the optical fiber 43 is reflected by the X-axis mirror 45a and the Y-axis mirror 45b. As a result, laser light is emitted toward the workpiece 71, as indicated by the arrow 89.

When the X-axis motor 47a changes the orientation of the X-axis mirror 45a as indicated by the arrow 87, the orientation in which the laser beam is emitted in the X-axis direction is changed. When the Y-axis motor 47b changes the orientation of the Y-axis mirror 45b as indicated by the arrow 88, the orientation in which the laser beam is emitted in the Y-axis direction is changed. By adjusting the orientation of the X-axis mirror 45a and the orientation of the Y-axis mirror 45b, the orientation of the emitted laser beam is adjusted.

In this way, the laser welding head 41 can control the irradiation position of the laser beam on the workpiece 71 in two dimensions by controlling the reflection angle of the laser beam on the X-axis mirror 45a and the Y-axis mirror 45b. Such a laser welding head 41 is referred to as a galvano scanner.

Note that the laser welding head may not include an emission direction adjustment mechanism. Alternatively, any mechanism that can adjust the direction in which the laser beam is emitted can be employed as the emission direction adjustment mechanism. For example, a laser welding head including a mechanism for adjusting the emission direction of laser light by using a lens may be employed, such as a trepanning head.

With reference to FIG. 2, in the method for manufacturing an electric motor according to the present embodiment, a plurality of the electromagnetic steel sheets 28 punched into a predetermined shape are prepared. Next, a block of electromagnetic steel sheets is produced by swaging a plurality of electromagnetic steel sheets. Then, the stator core 27 can be formed by overlaying a plurality of the blocks of the electromagnetic steel sheets.

Next, the coil 16 is disposed around teeth of the stator core 27. The front-side housing 21 and the rear-side housing 22 are then fixed to the stator core 27 by the bolts 30. An assembly including the front-side housing 21, the stator core 27 and the rear-side housing 22 is formed.

In the present embodiment, the bolt 30 is used as a fastening member to secure the front-side housing 21 and the rear-side housing 22 to the stator core 27, but the embodiment is not limited to this. By using any fastening member, the front-side housing, stator core, and rear-side housing can be secured to one another.

Next, laser welding is performed by the welding device 3. With reference to FIG. 5, the assembly serving as the workpiece 71 is attached to the workpiece fixing portion 63 of the welding device 3. At this time, the assembly is fixed to the workpiece fixing portion 63 so that the rotation axis RA of the feed axis motor 1 and the rotation axis of the workpiece fixing portion 63 coincide.

The controller 64 moves the workpiece 71 in the X-axis direction and the Y-axis direction so that the position at which the workpiece 71 is irradiated with the laser beam is a predetermined position based on an operation program. In addition, the controller 64 moves the movement member 59 in the Z-axis direction such that the laser welding head 41 separates from the workpiece 71 by a predetermined distance.

The controller 64 then drives the laser oscillator 42 and irradiate the boundary portion between the front-side housing 21 and the stator core 27 with the laser beam. The controller 64 performs control for moving the table 54 in the Y-axis direction and control of rotating the workpiece 71 in the A-axis direction while irradiating the laser beam. In addition, control is performed to move the laser welding head 41 in the Z-axis direction as necessary. By performing this control, the welding mark 35 can be formed along the circumferential direction of the workpiece 71.

Note that the laser welding head 41 according to the present embodiment includes the emission direction adjustment mechanism 44. Thus, when adjusting the irradiation position of the laser beam on the workpiece 71 in the X-axis direction or the Y-axis direction, the laser beam may be moved by using the emission direction adjustment mechanism 44.

Figure 7:
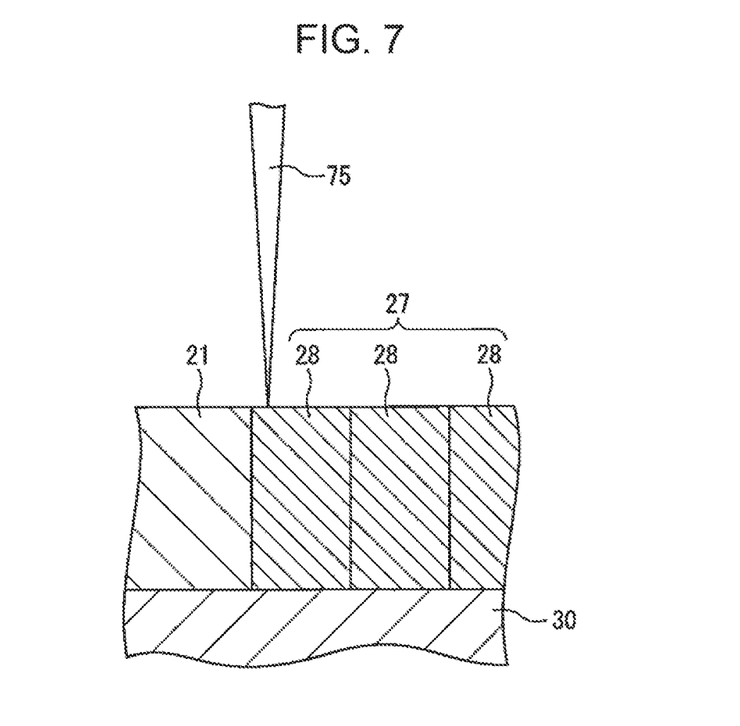
FIG. 7 is an enlarged cross-sectional view of a boundary portion between a front-side housing and a stator core when laser welding is performed by the welding device.

FIG. 7 is an enlarged cross-sectional view of the boundary portion between the front-side housing and stator core when irradiating with laser light. In the laser welding according to the present embodiment, the different material welding is performed for welding a member with aluminum as a main component and a member with iron as a main component. The melting point of aluminum is lower than the melting point of iron. Thus, the welding device 3 irradiates a laser beam 75 at a position slightly shifted toward the electromagnetic steel sheets 28 from a position at which the electromagnetic steel sheets 28 and the front-side housing 21 are in contact.

As for a processing condition in the present embodiment, an output of the fiber laser can be set to be, for example, 600 W±20%. In the present embodiment, the laser beam continuously oscillates. Further, the processing speed (movement speed of the irradiation position) can be set within a range of 10000 mm/min±20%. The irradiation position of the laser beam can be set within a range of 0.1 mm±20, from a position where the electromagnetic steel sheets 28 and the front-side housing 21 are in contact. The laser beam 75 can irradiate the surface of the electromagnetic steel sheets 28 in direction of 90°±20%. The focus position of the laser beam is 0 mm. That is, the position in the Z-direction of the laser welding head 41 is adjusted such that the focal point is positioned on the surface of the electromagnetic steel sheets 28.

The conditions for irradiating the laser beam are not limited to the above-described aspects, and any condition that allows the front-side housing 21 and the stator core 27 to be welded can be employed. For example, welding may be performed based on a condition where the output of the laser beam is reduced and the processing speed is slowed.

Welding with a fiber laser can reduce spot diameter further than welding with other lasers. For fiber lasers, fine ranges of laser welding can be performed with high accuracy. For example, each of the electromagnetic steel sheets 28 can be formed at a thickness of approximately 0.5 mm. Additionally, by performing welding using a fiber laser, the width of the welding mark can be suppressed to approximately 0.1 mm. Thus, when welding using a fiber laser, high quality processing with a small welding mark width can be performed. Note that the laser welding is not limited to welding using a fiber laser. The welding mark may be formed by any welding device, such as a welding device using a carbon dioxide gas laser.

Next, the welding mark 35 is formed at the boundary portion between the rear-side housing 22 and the stator core 27 in a similar manner as described above. Next, an impregnating agent is disposed on the surface of the assembly and the coil. Through placing the impregnating agent, the coil can be fixed or the coil can be insulated. Alternatively, gaps between electromagnetic steel plates can be sealed by disposing the impregnating agent. The surface of the assembly can then be painted.

Note that, in the present embodiment, a welding device in which the workpiece moves in the X-axis direction and the Y-axis direction and the laser welding head moves in the Z-axis direction is used, but the embodiment is not limited to this. Any device capable of forming a welding mark at the boundary portion between the front-side housing and the stator core can be employed. For example, a laser welding head can be attached to an articulated robot as an operation tool. Then, laser welding may be performed along the outer circumferential surface of the assembly by changing the position and orientation of the robot.

Figure 8:
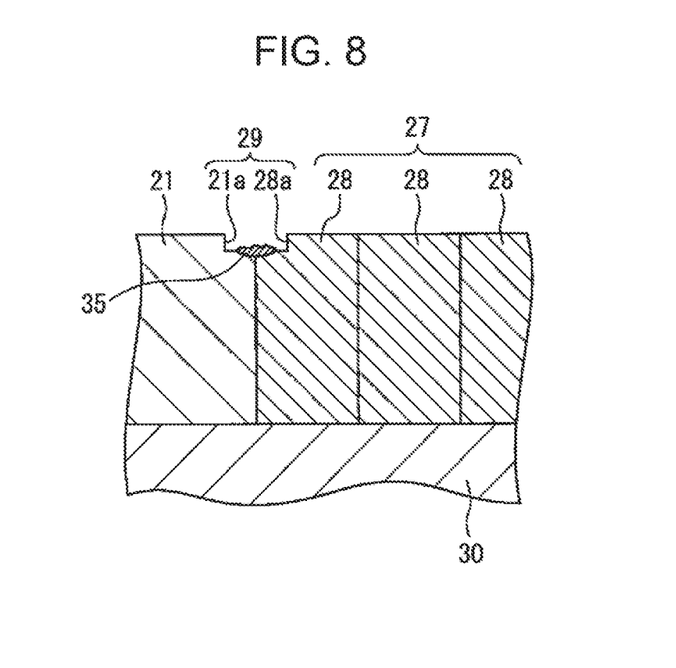
FIG. 8 is an enlarged cross-sectional view of a boundary portion between a front-side housing and a stator core of a second electric motor according to an embodiment.

FIG. 8 is an enlarged cross-sectional view of a boundary portion between a front-side housing and a stator core of a second electric motor according to the present embodiment. The front-side housing 21 of the second electric motor includes a step portion 21a formed at an end part that is joined to the stator core 27. Additionally, in the stator core 27, a step portion 28a is formed at an end part of the electromagnetic steel sheets 28 joined to the front-side housing 21. The step portion 21a and 28a is formed at the boundary portion between the front-side housing 21 and the stator core 27. The step portion 21a of the front-side housing 21 makes contact with the step portion 28a of the stator core 27, whereby a recess 29 is formed at the boundary portion. The recess 29 is formed so as to be recessed from the outer circumferential surface of the stator core 27 and the outer circumferential surface of the front-side housing 21. The recess 29 is formed across the entire circumferential direction.

The welding mark 35 is formed within the recess 29. The welding mark 35 is formed on a bottom surface of the recess 29. The recess 29 has a depth configured to accommodate the welding mark 35 within the recess 29. The welding mark 35 may include a portion that protrudes from the surface to be welded. Further, the welding mark 35 may have formed irregularities on the surface not formed to be a smooth surface.

In the second electric motor, if the welding mark 35 includes a portion that protrudes outward, the welding mark 35 is formed so as not to protrude from the outer circumferential surface of the stator core 27 and the outer circumferential surface of the front-side housing 21.

Figure 9:
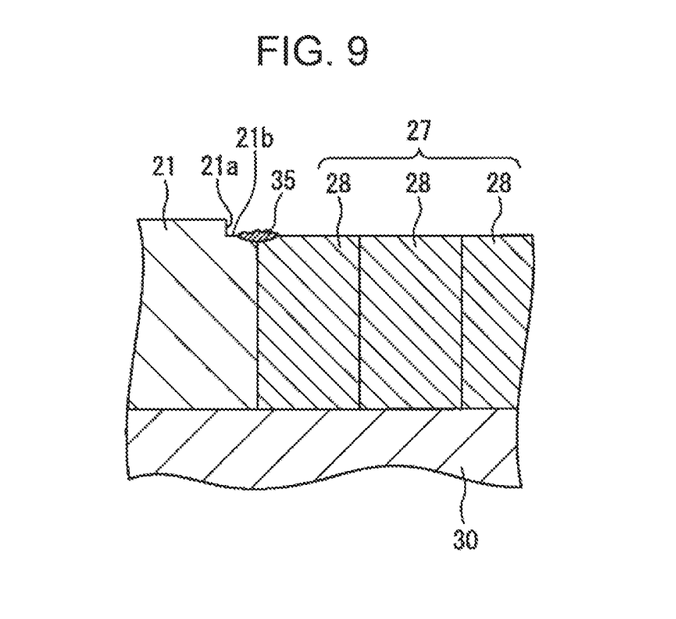
FIG. 9 is an enlarged cross-sectional view of a boundary portion between a front-side housing and a stator core of a third electric motor according to an embodiment.

FIG. 9 is an enlarged cross-sectional view of a boundary portion between a front-side housing and a stator core in a third electric motor according to the present embodiment. In the third electric motor, the outer diameter of the stator core 27 is formed to be smaller than the outer diameter of the front-side housing 21. The step portion 21a is formed at the boundary portion to the stator core 27 in the front-side housing 21 so as to be recessed from the outer circumferential surface of the front-side housing 21. The diameter of a bottom surface 21b of the step portion 21a is the same as the diameter of the outer circumferential surface of the stator core 27. The step portion 21a is formed so as to be taller than the height at which the welding mark 35 protrudes from the surface of the stator core 27 and the bottom surface 21b of the step portion 21a. The step portion 21a is formed across the entire circumferential direction. In the third electric motor, the welding mark 35 is formed so as not to protrude from the outer circumferential surface of the front-side housing 21.

In the second electric motor and the third electric motor, the outer diameter of the electric motor can be suppressed from becoming large due to the welding mark 35. Alternatively, when the electric motor is attached to another device, it is possible to prevent the electric motor from not being able to be mounted at a desired state, due to the welding mark 35. For example, if fixing the feed axis motor 1 to a mounting surface, contact between the welding mark and the mounting surface can be avoided. Alternatively, when the electric motor is transported by a robot device or the like, it is possible to prevent the hand from not being able to grip the electric motor, due to the welding mark 35.

In the second electric motor and the third electric motor, the configurations, actions, effects, and manufacturing methods other than those described above are the same as those of the first electric motor, and thus descriptions thereof will not be repeated here.

Note that, in the example illustrated in FIG. 9, the step portion 21a is formed on the end part of the outer circumferential surface of the front-side housing 21, but the embodiment is not limited to this. A step portion may be formed on an end part of the outer circumferential surface of the stator core 27 without forming a step portion on the end of the outer circumferential surface of the front-side housing 21.

In the laser welding according to the present embodiment, the laser welding without using a welding wire as a filler is performed, but the embodiment is not limited to this. The laser welding may be performed by using a welding wire. The welding wire can be used in order to smooth the surface of the welding mark. When welding is performed by using a welding wire, the portion of the welding mark protruding from the outer circumferential surface of the front-side housing and the outer circumferential surface of the stator core is increased. Thus, it is preferable to form a recess or a step portion at the boundary portion between the front-side housing and the stator core.

Figure 10:
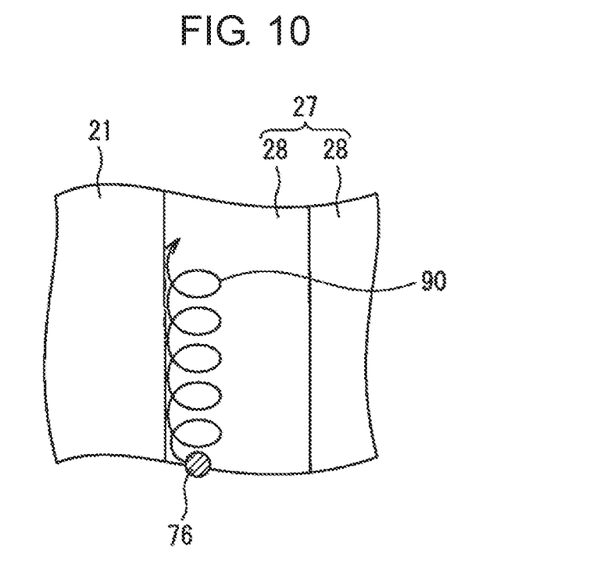
FIG. 10 is an enlarged plan view of the front-side housing and the stator core for explaining wobbling-processing when laser welding is performed.

FIG. 10 is an explanatory diagram of another welding method according to the present embodiment. FIG. 10 is an enlarged plan view of the boundary portion between front-side housing 21 and stator core 27. In the welding method according to the embodiments described above, the welding device 3 is driven such that the irradiation position at which the laser beam is irradiated moves linearly with respect to the assembly.

In contrast, in another irradiation method, the welding device 3 is driven such that the irradiation position at which the laser beam is irradiated moves in a spiral manner with respect to the assembly. As indicated by the arrow 90, the laser beam is irradiated so that a spot 76 of the laser beam advances in a spiral manner. Such an irradiation method can be performed by, for example, controlling the emission direction adjustment mechanism 44 such that the spot 76 moves along the track of a circle while moving the workpiece 71 in the Y-axis direction. A processing method in which the spot 76 moves in a spiral manner is referred to as wobbling-processing.

The width of the welding mark 35 can be increased by using the wobbling-processing for welding the boundary portion between the front-side housing 21 and the stator core 27. Since the spot diameter of the laser beam is small, high precision control is required to move the laser beam along the line of contact between the front-side housing 21 and the stator core 27. Thus, the spot of the laser beam may deviate from the desired position. However, by performing the wobbling-processing, the welding mark 35 can be formed so as to reliably cover the line of contact. The boundary portion between the front-side housing 21 and the stator core 27 can be more reliably sealed.

In the present embodiment, a feed axis motor of a machine tool is described as an example as an electric motor, but the embodiment is not limited to this. The electric motor according to the present embodiment can be disposed in any device. In particular, the structure of the present embodiment is suited to an electric motor used in an environment in which a large amount of foreign material is present.

In the electric motor according to the aspects of the present disclosure, the boundary portion between a stator core and a housing can be sealed without disposing a seal member made of resin or rubber between the stator core and the housing.

The above embodiments can be combined as appropriate. In each of the above figures, the same or the like portions are denoted by the same reference numerals. Note that the above-described embodiments are merely examples and are not intended to limit the invention. Further, in the embodiments, modifications of the embodiment described in the claims are included.

The invention claimed is:

1. An electric motor comprising:
a rotor including a shaft;
a stator including a stator core and a coil wound around the stator core; and
a housing fixed to an end face of the stator core, wherein the stator core is formed of a material with iron as a main component,
the housing is formed of a material with aluminum as a main component,
the stator core and the housing are coupled with each other by a welding mark generated by laser welding,
the welding mark is formed at a boundary portion at which the stator core and the housing are contacting, extends in a circumferential direction so as to cover a line of contact between the stator core and the housing, and seals an entire boundary portion between the stator core and the housing.

2. The electric motor according to claim 1, wherein
the housing includes a step portion formed at the boundary portion;
the stator core includes a step portion formed at the boundary portion;
the step portion of the housing and the step portion of the stator core contact and form a recess portion at the boundary portion;
the welding mark is formed on a bottom surface of the recess; and
the recess has a depth configured to accommodate the welding mark within the recess.

3. The electric motor according to claim 1, wherein
one member of the housing and the stator core includes a step portion formed at a boundary portion, and
the step portion is formed being higher than a height of protrusion of the welding mark.

4. The electric motor according to claim 1, further comprising a plurality of the housings, wherein
the plurality of the housings include a front-side housing disposed in a direction in which the shaft protrudes, and a rear-side housing disposed on a side opposite to the direction in which the shaft protrudes, the welding marks are formed at a boundary portion between the front-side housing and the stator core and a boundary portion between the rear-side housing and the stator core.

* * * * *